US008960750B2

(12) United States Patent
Gong et al.

(10) Patent No.: US 8,960,750 B2
(45) Date of Patent: Feb. 24, 2015

(54) SUCTION DEVICE

(71) Applicants: Shenzhen Futaihong Precision Industry Co., Ltd., Shenzhen (CN); FIH (Hong Kong) Limited, Kowloon (HK)

(72) Inventors: Xu Gong, Shenzhen (CN); Bing Yu, Shenzhen (CN); Jian-Ping Jin, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 13/945,090

(22) Filed: Jul. 18, 2013

(65) Prior Publication Data

US 2014/0183889 A1    Jul. 3, 2014

(30) Foreign Application Priority Data

Dec. 29, 2012    (CN) .......................... 2012 1 05883469

(51) Int. Cl.
*B25J 15/00*    (2006.01)
*B25J 15/06*    (2006.01)

(52) U.S. Cl.
CPC .......... *B25J 15/0616* (2013.01); *B25J 15/0057* (2013.01); *Y10S 901/40* (2013.01)
USPC .............................. 294/188; 901/40; 414/737

(58) Field of Classification Search
USPC ......... 294/183, 185, 188, 65, 2, 86.4; 901/40; 414/736, 737
See application file for complete search history.

(56) References Cited

U.S. PATENT DOCUMENTS

| 3,613,571 | A  | * | 10/1971 | Russell et al. .................. 101/40 |
| 5,809,639 | A  | * | 9/1998  | Alvite ............................. 29/740 |
| 6,503,047 | B2 | * | 1/2003  | Zaiss ............................. 414/737 |
| 7,028,392 | B1 | * | 4/2006  | Schiebel ......................... 29/740 |
| 7,841,633 | B2 | * | 11/2010 | Nankervis et al. ............ 294/188 |
| 7,971,915 | B2 | * | 7/2011  | Kimura ......................... 294/188 |
| 8,414,247 | B2 | * | 4/2013  | Yeh et al. ...................... 414/800 |
| 2005/0008470 | A1 | * | 1/2005 | Baclija et al. ................. 414/736 |
| 2006/0157997 | A1 | * | 7/2006 | Meredith et al. ................ 294/65 |
| 2013/0302126 | A1 | * | 11/2013 | Schaller et al. ............... 414/737 |

\* cited by examiner

*Primary Examiner* — Saul Rodriguez
*Assistant Examiner* — Gabriela Puig
(74) *Attorney, Agent, or Firm* — Novak Druce Connolly Bove + Quigg LLP

(57) ABSTRACT

A device for vacuum-lifting workpieces includes a driving assembly, a rotating table, a plurality of suction assemblies mounted on the rotating table spaced from each other, and a vacuum pump. Each suction assembly includes a suction cup. An airflow guiding part is configured to align each suction cup with a vacuum when the suction cup is positioned above a picking station. The driving assembly makes the suction cups communicate with the airflow guiding part in succession. Each suction assembly is capable of picking a different type of workpiece, therefore the suction device can take the place of a plurality of individual manipulators.

9 Claims, 5 Drawing Sheets

SUCTION DEVICE

BACKGROUND

1. Technical Field

The present disclosure relates to suction devices, especially relates to a suction device for vacuum-lifting multiple types of workpieces.

2. Description of Related Art

Assembling a keystroke of a cell phone may include the following steps: pasting a foam on an inner surface of the keystroke, and pasting a protecting film on an opposite outer surface of the keystroke. However, since the foam differs from the protecting film in shape or/and size, each of the above steps is required done by different manipulators.

Therefore, there is room for improvement within the art.

BRIEF DESCRIPTION OF THE FIGURES

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
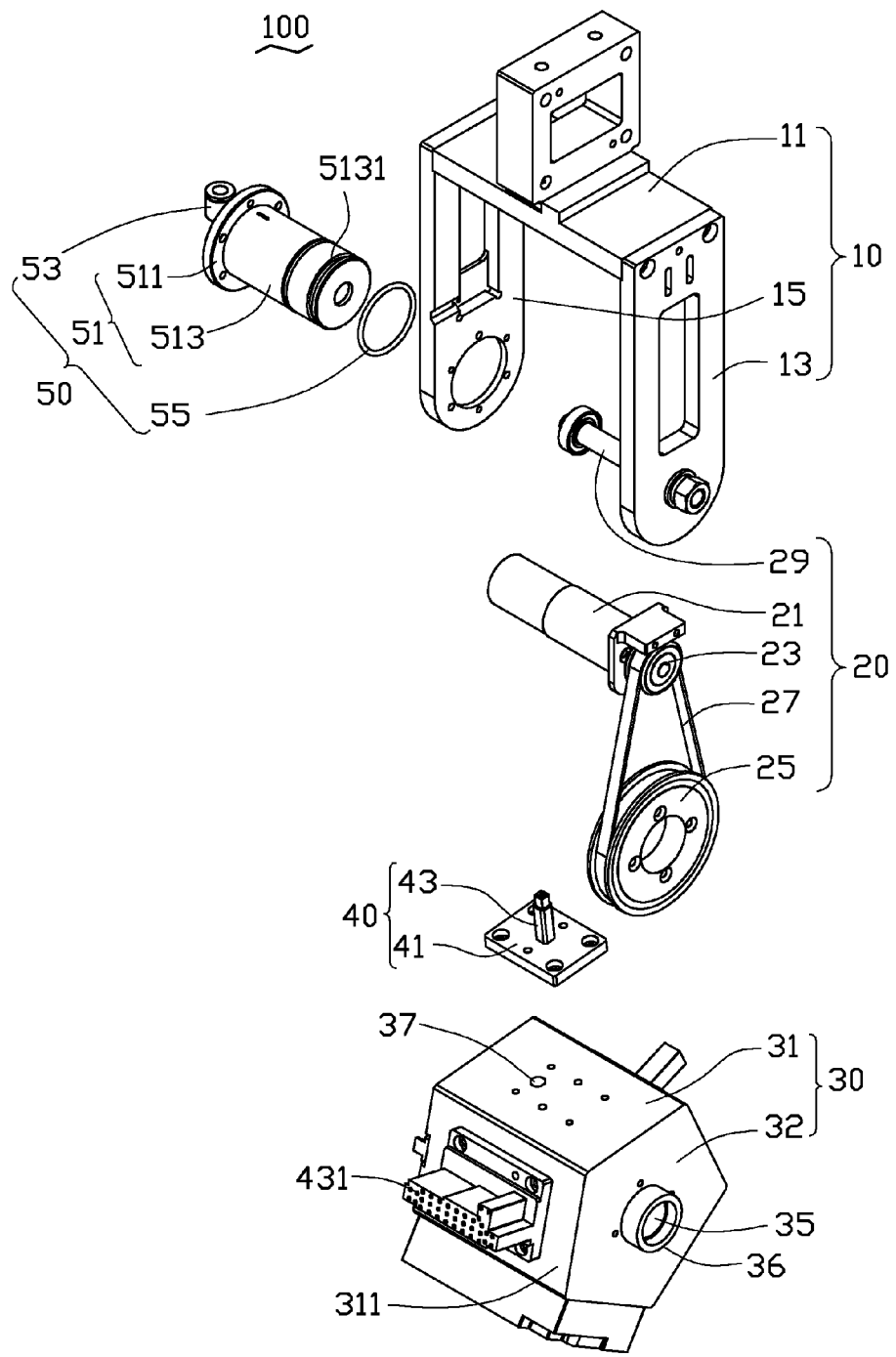
FIG. 1 is an exploded view of an exemplary embodiment of a suction device.
Figure 2:
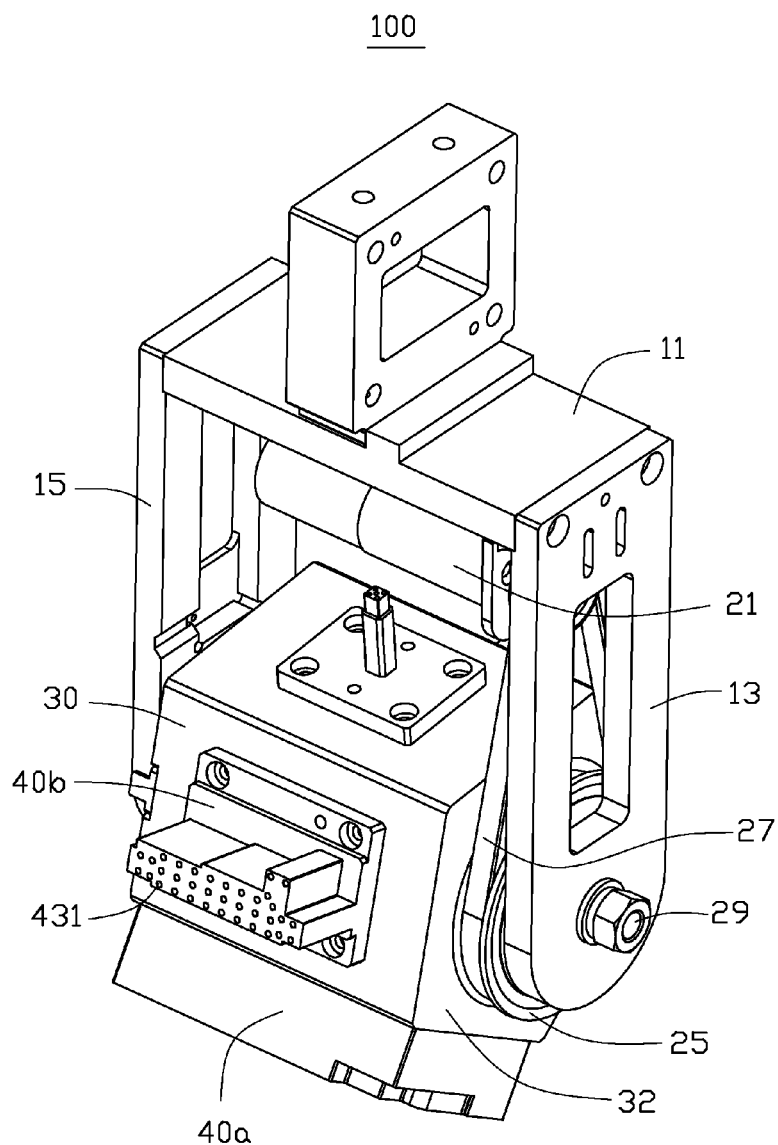
FIG. 2 is an assembled, schematic view of the suction device in FIG. 1.
Figure 3:
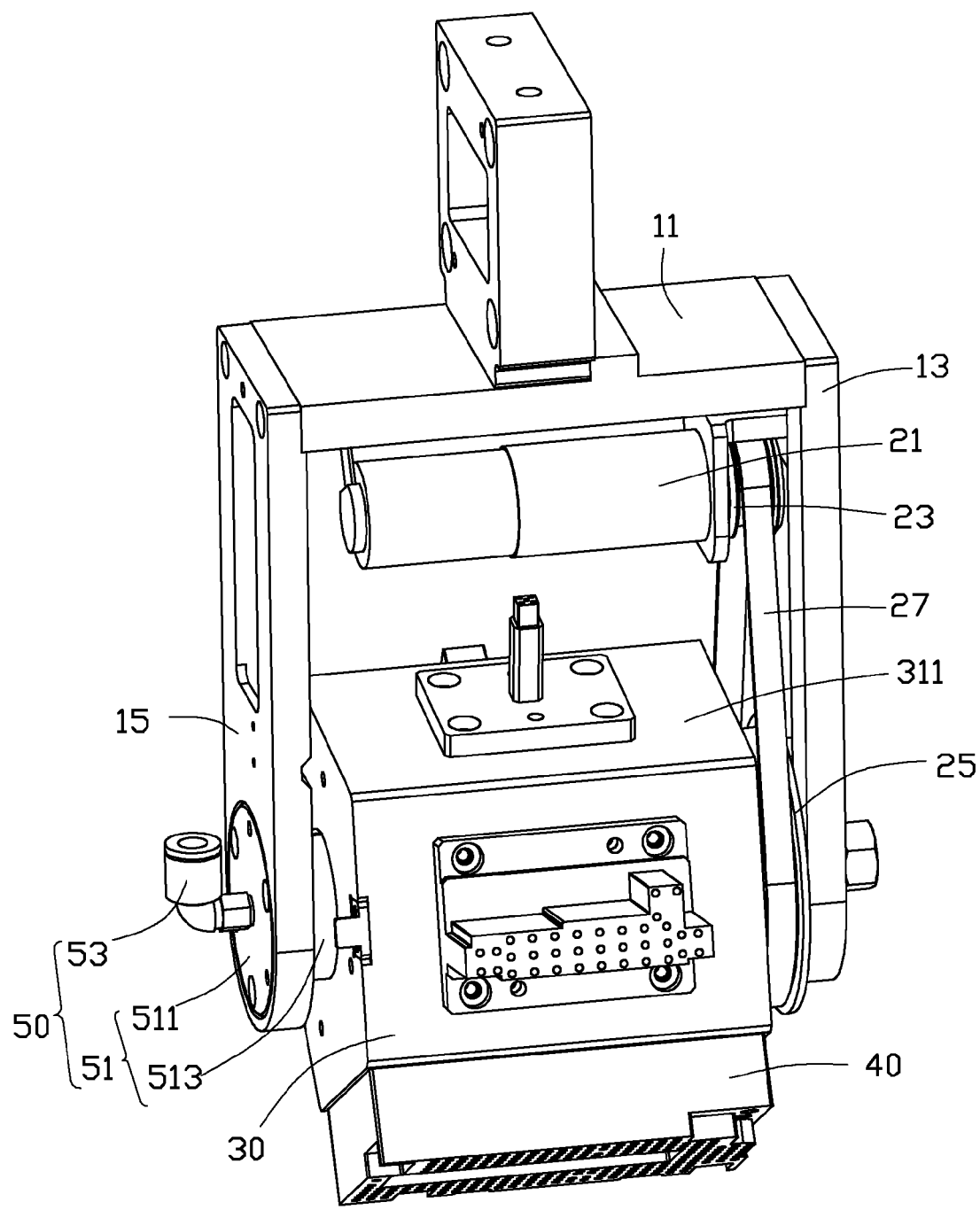
FIG. 3 is similar to FIG. 2 but viewed from another angle.

Referring to FIGS. 1-3, an exemplary embodiment of a suction device 100 used for vacuum-lifting multiple types of workpieces. The suction device 100 includes a fixing bracket 10, a driving assembly 20, a rotating table 30, a plurality of suction assemblies 40 and a vacuum pump assembly 50. The driving assembly 20, the rotating table 30, and the vacuum pump assembly 50 are mounted on the fixing bracket 10. The plurality of suction assemblies 40 are mounted on the rotating table 30 and spaced from each other. The fixing bracket 10 is mounted to a manipulator (not shown), which positions the suction device 100.

The fixing bracket 10 includes a connecting board 11, a first arm 13, and a second arm 15. The first arm 13 and the second arm 15 are attached to two opposite ends of the connecting board 11 and spaced-apart from each other. The connecting board 11 is mounted to the manipulator.

The driving assembly 20 is attached to the first arm 13. The driving assembly 20 includes an electrically-driven motor 21, a driving wheel 23, a follower wheel 25, a conveyor belt 27, and a shaft 29. The motor 21 is secured to the first arm 13. Two opposite ends of the conveyor belt 27 are respectively sleeved to the driving wheel 23 and the follower wheel 25. The shaft 29 is rotatably mounted on the first arm 13. The shaft 29, the follower wheel 25, and the rotating table 30 are coaxially mounted on the first arm 13. The motor 21 drives the driving wheel 23 to make the follower wheel 25 rotate via the conveyor belt 27, and then the rotating table 30 rotates along with the follower wheel 25. In the exemplary embodiment, the motor 21 is a stepper motor.

Figure 4:
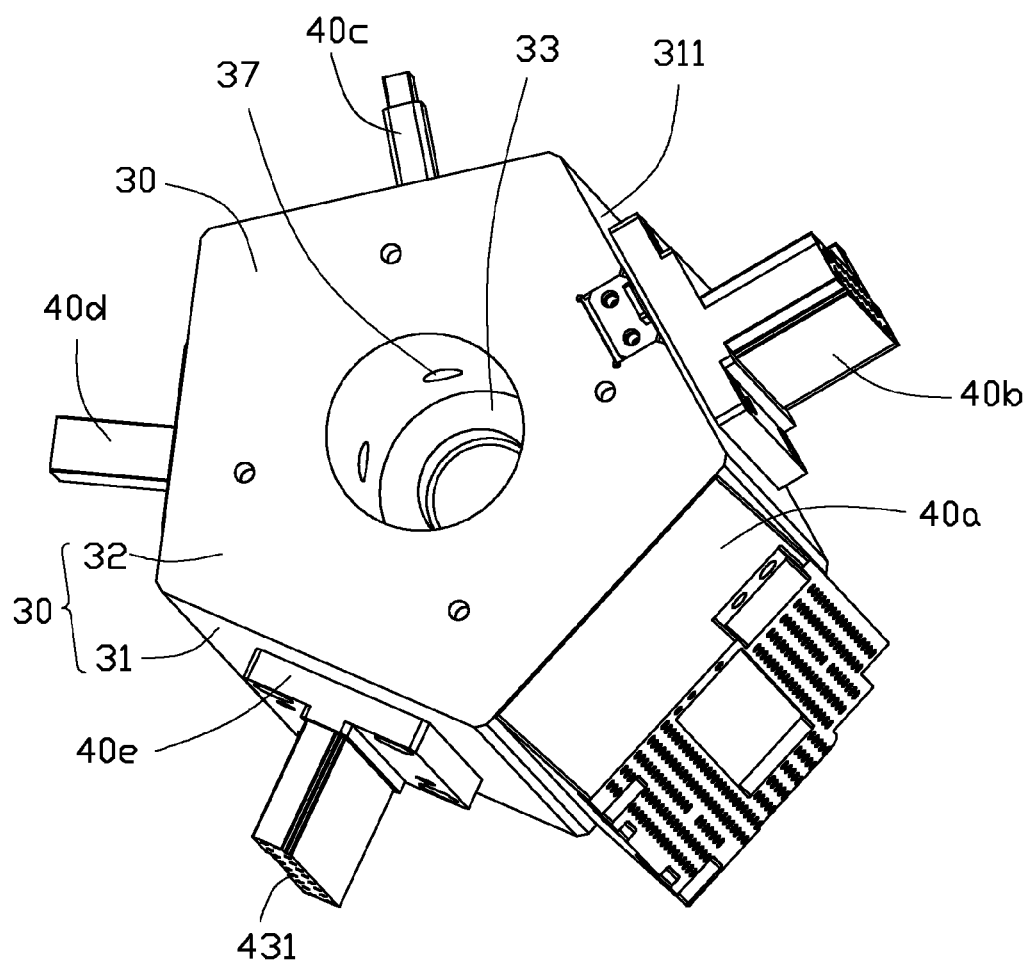
FIG. 4 is an enlarged view of a rotating table and a suction assembly of the suction device in FIG. 1.

Referring to FIG. 4, the rotating table 30 having a substantially cylindrical shape includes a sidewall 31 and two opposite end walls 32. The plurality of suction assemblies 40 is equidistantly located on the sidewall 31 of the rotating table 30. In the exemplary embodiment, the rotating table 30 is a regular polygon in cross-section. The sidewall 31 includes a plurality of fixing surfaces 311 with identical areas, which are successively connected to each other. Each suction assembly 40 is mounted on one of the plurality of fixing surfaces 311. In the exemplary embodiment, the rotating table 30 has a regular pentagonal cross-sectional shape and includes five fixing surfaces 311, and the suction device 100 includes five suction assemblies 40a, 40b, 40c, 40d, 40e.

One end wall 32 of the rotating table 30 defines a fixing groove 33. The opposite end wall 32 defines an engagement groove 35 (see FIG. 1) and a protrusion 36 surrounding the engagement groove 35. The sidewall 31 defines a plurality of through holes 37. Each through hole 37 is located on one of the suction assemblies 40 and communicates with the fixing groove 33. The through holes 37 extend towards inside of the fixing groove 33. The inner ends of the plurality of through holes 37 all intersect at a single circle inside the rotating table 30, that is to say, they are located in a same radial plane.

One end of the shaft 29 located apart from the first arm 13 is received in the engagement groove 35. The protrusion 36 is attached to the follower wheel 25. Thus, the rotating table 30, the follower wheel 25, and the shaft 29 are fixed together and rotate simultaneously.

Each suction assembly 40 includes a fixing block 41 and a suction cup 43. The fixing block 41 attached to one of the fixing surface 311 defines a connecting hole (not shown) communicating with a through hole 37 of the fixing surface 311. The suction cup 43 defines at least one suction port 431 communicating with the through hole 37 via the connecting hole. In the exemplary embodiment, the suction port 431 of one suction assembly 40 may differ in shape and/or structure from the suction port 431 of another suction assembly 40, to facilitate the vacuum-lifting of different workpieces.

Figure 5:
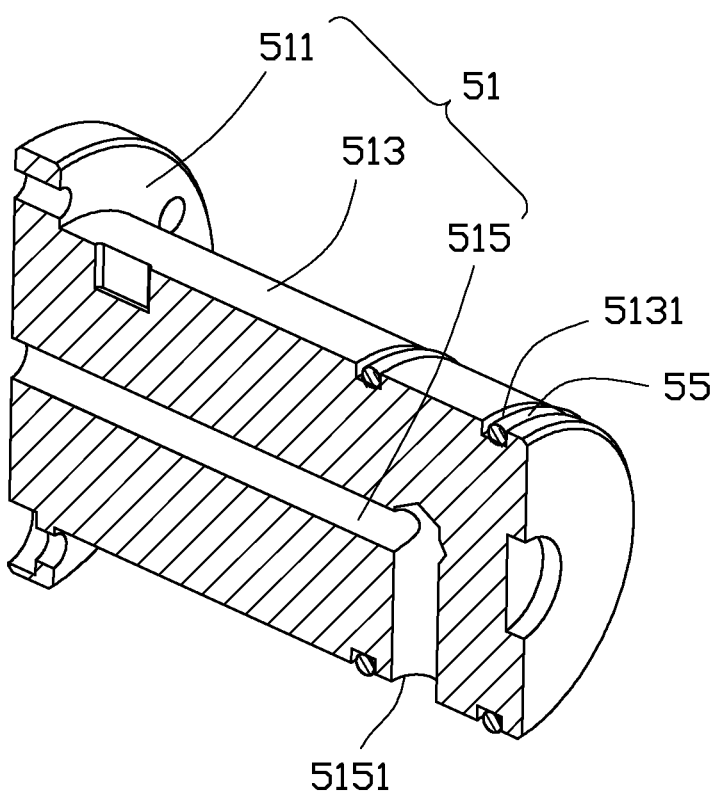
FIG. 5 is a cross sectional view of an airflow guiding part of the suction device in FIG. 1.

Referring to FIG. 5, the vacuum pump assembly 50 includes an airflow guiding part 51 and a connector 53. The airflow guiding part 51 communicates with a vacuum generator (not shown) by the connector 53, to generate a vacuum in the suction cup 43.

The airflow guiding part 51 includes an adjoining element 511 and a guiding element 513 connected to the adjoining element 511. The adjoining element 511 is mounted on the second arm 15 (see FIG. 3). The guiding element 513 has a cylindrical shape, which fits into the circular fixing groove 33. The guiding element 513 is not rotated by the fixing groove 33.

The airflow guiding part 51 further defines a guiding hole 515. The guiding hole 515 has one end communicating with the connector 53 and an opposite end opening on the periphery of the airflow guiding part 51. In the exemplary embodiment, the guiding hole 515 is substantially L-shaped in section. One end of the guiding hole 515 extends through the end of adjoining element 511 mounted on the second arm 15. The opposite end of the guiding hole 515 extends through a sidewall of the airflow guiding part 51 to define a gas evacuation hole 5151. The connector 53 connects to the vacuum generator via a gas pipe (not shown).

In the exemplary embodiment, any gap between the sidewall of the guiding element 51 and the peripheral wall of the fixing groove 33 is less than 0.01 mm to prevent hermetic leakage, thus the workpiece is secure when being vacuum-lifted by the suction assembly 40. The vacuum pump assembly 50 further includes two gaskets 55 to enhance the hermetic properties of the suction device 100. In the exemplary embodiment, each gasket 55 is substantially O-shaped and made of elastic materials. The guiding element 513 further defines two fastening grooves 5131 spaced from each other, which are located on opposite sides of the gas evacuation hole 5151. Each fastening groove 5131 is defined in and around the sidewall of the guiding element 513. Each gasket 55 is latched within one of the fastening grooves 5131 and abuts against the peripheral wall of the fixing groove 33 to seal the gas evacuation hole 5151.

Referring to FIGS. 2-5, in use, the driving assembly 20 drives the rotating table 30 to rotate one of the suction assemblies 40, such as suction assembly 40a, to a picking station. Thus, the suction cup 43 is aligned with a workpiece, and the through hole 37 is configured to be in communication with a suction cup 43 at this point. The vacuum generator is turned on, and the suction cup 43 vacuum-lifts the workpiece. The driving assembly 20 continues to rotate the rotating table 30 to make another suction assembly 40, say suction assembly 40b, move to the picking station. Thus, the suction cup 43 of the suction assembly 40b is aligned with another workpiece, and then the suction port 431 vacuum-lifts another workpiece. In this way, as the rotating table 30 is rotated, the suction ports 431 of suction assemblies' 40b-4e can vacuum-lift workpieces in succession.

Since the suction device 100 includes a plurality of suction assemblies 40, each suction assembly 40 is capable of picking one type of workpiece, therefore the suction device 100 can pick multiple and different workpieces, to avoid a plurality of manipulators being required. Thus, the suction device 100 reduces the cost of production and the volume of working space.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. A suction device, comprising:
a driving assembly;
a rotating table comprising a sidewall and two opposite end walls, wherein one end wall of the rotating table defines a fixing groove, the sidewall defines a plurality of through holes;
a plurality of suction assemblies mounted on the rotating table and spaced from each other, each suction assembly comprising a suction cup, wherein each through hole is located on one of the suction assemblies and communicates with the fixing groove;
a vacuum pump assembly comprising an airflow guiding part and a connector, the driving assembly driving the rotating table to rotate the suction cup of one of the suction assemblies to communicate with the airflow guiding part, a vacuum generator communicating with the airflow guiding part and generates a vacuum in the suction cup; wherein the airflow guiding part defines a guiding hole, the guiding hole has one end communicating with the vacuum generator, and an opposite end receiving in the fixing groove, the driving assembly driving the rotating table rotates to make the plurality of the through holes communicate with the guiding hole in succession; the guiding hole is substantially L-shaped in section, one end of the guiding hole extends through the end wall of the rotating table mounted on the second arm and connects to the connector, the opposite end of the guiding hole extends through a sidewall of the airflow guiding part to define a gas evacuation hole; and
a fixing bracket comprising a connecting board, a first arm and a second arm; wherein the first arm and the second arm are attached to two opposite ends of the connecting board and opposite to each other, the driving assembly is attached to the first arm, the vacuum pump assembly is attached to the second arm.

2. The suction device of claim 1, wherein the sidewall comprises a plurality of fixing surfaces connecting with each other, each suction assembly is mounted on one of the plurality of fixing surfaces, each through hole is mounted on one of the fixing surface.

3. The suction device of claim 1, wherein the suction port of one of the suction assemblies differs in shape and/or structure from the suction port of another suction assembly.

4. The suction device of claim 1, wherein the airflow guiding part comprises an adjoining element, and a guiding element connected with the adjoining element; the adjoining element is mounted on the second arm, the guiding element has a cylindrical shape which fits into the circular fixing groove.

5. The suction device of claim 4, wherein the gap located between the sidewall of the guiding element and the peripheral wall of the fixing groove is less than 0.01 mm.

6. The suction device of claim 5, wherein the guiding element further defines two fastening groove spaced from each other, which are located on opposite sides of the gas evacuation hole; each fastening groove is defined in and around the sidewall of the guiding element, the vacuum pump assembly further comprises two gaskets, each gasket is latched within one of the fastening groove and abuts against the peripheral wall of the fixing groove to seal the gas evacuation hole.

7. The suction device of claim 6, wherein the driving assembly is attached to the first arm, the driving assembly comprises motor, a driving wheel, a follower wheel, a conveyor belt, and a shaft; the motor is secured to the first arm, two opposite ends of the conveyor belt are respectively sleeved to the driving wheel and the follower wheel, the shaft is rotatably mounted on the first arm.

8. The suction device of claim 7, wherein the shaft, the follower wheel and the rotating table are coaxially mounted on the first arm, the motor drives the driving wheel to make the follower wheel rotate via the conveyor belt and the rotating table rotates along with the follower wheel.

9. The suction device of claim 5, wherein the gaskets are made of elastic materials.

* * * * *